US00RE38231E

(19) United States
(12) Reissued Patent
Fargason

(10) Patent Number: US RE38,231 E
(45) Date of Reissued Patent: Aug. 26, 2003

(54) SCENT-FREE WILDLIFE BLIND

(76) Inventor: William H. Fargason, P.O. Box 36635, Birmingham, AL (US) 35236

(21) Appl. No.: 10/007,208

(22) Filed: Nov. 5, 2001

Related U.S. Patent Documents

Reissue of:
(64) Patent No.: 5,983,913
Issued: Nov. 16, 1999
Appl. No.: 09/093,610
Filed: Jun. 9, 1998

(51) Int. Cl.[7] ..... E04H 15/02
(52) U.S. Cl. ..... 135/900; 135/901; 135/93; 52/79.1; 43/1
(58) Field of Search ..... 52/79.1, 143; 135/900, 135/901, 90, 93, 94, 119; 43/1; 4/445, 459

(56) References Cited

U.S. PATENT DOCUMENTS

| | | | | | |
|---|---|---|---|---|---|
| 1,123,657 | A | * | 1/1915 | Bache | 135/93 |
| 3,018,857 | A | * | 1/1962 | Parham | 135/901 |
| 4,186,507 | A | * | 2/1980 | Stinnett | 43/1 |
| 4,478,234 | A | * | 10/1984 | Bester | 135/98 |
| 4,606,142 | A | * | 8/1986 | Reneau | 43/1 |
| 4,719,716 | A | * | 1/1988 | Chrisley, Jr. | 43/1 |
| 4,794,717 | A | * | 1/1989 | Horsmann | 135/901 |
| 4,798,019 | A | * | 1/1989 | Sury et al. | 135/901 |
| 5,101,604 | A | * | 4/1992 | Wardlaw, III | 135/116 |
| 5,371,966 | A | * | 12/1994 | Hall | 135/117 |
| 5,749,387 | A | * | 5/1998 | Thompson | 135/146 |

FOREIGN PATENT DOCUMENTS

| | | | |
|---|---|---|---|
| AT | 54220 | * | 7/1912 |
| CH | 348230 | * | 9/1960 |

* cited by examiner

*Primary Examiner*—Janet M. Wilkens
(74) *Attorney, Agent, or Firm*—Russell Carter Cache; C. Brandon Browning; Sirote & Permutt, P.C.

(57) ABSTRACT

The invention is a scent-free wildlife blind. The blind has a room-like shelter having a door, a plurality of windows, a small vent near ground level, and a flexible tube extending from the top of the shelter to a height of approximately 30 feet from the ground. When the wind hits the shelter, the windspeed will be higher at the top of the tube than at the bottom vent. The pressure exerted by the wind on the air inside the shelter is inversely proportional to the wind speed. Therefore, the pressure difference will force air in through the bottom vent and out through the top of the tube, carrying the scent of the occupants out of the blind high enough so that nearby animals will not smell the occupants.

29 Claims, 5 Drawing Sheets

SCENT-FREE WILDLIFE BLIND

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to hunting blinds. Specifically, the invention is a hunting blind having an enclosed shelter, a vertical tube, and a vent at the bottom of the shelter, which permits the airflow through the blind to flow upward, expelling the occupant's scent high enough so that nearby animals will not smell it.

2. Description of the Related Art

Several inventors have devised other hunting blinds. However, most hunting blinds are designed primarily to fool the animal's eyesight, not their sense of smell. Conversely, the present invention is designed to disguise a hunter or wildlife observer from both the animal's eyes and its nose.

Some inventors use box-shaped blinds. For example, U.S. Pat. No. 3,018,857, issued to Roy P. Parham, describes a portable, enclosed, collapsible blind comprising hingedly connected panels. The blind is basically box-shaped with an open window in front, and a roof which folds out of the way to allow shooting to the rear. U.S. Pat. No. 4,186,507, issued to Arvil L. Stinnett, describes a blind comprising a collapsible frame covered with cloth.

Other inventors have taken additional steps to make their blinds look like part of the natural environment. For example, U.S. Pat. No. 4,794,717, issued to Edward O. Horsmann, describes a blind shaped like a bale of hay comprising tenting material covering a tubular frame. U.S. Pat. No. 4,798,019, issued to Patty A. Sury, describes a box-shaped blind having a tubular frame and fabric covering. The top is see through, and the sides have loops for holding surrounding vegetation to disguise the blind. Additionally, U.S. Pat. No. 5,371,966, issued to Rocky A. Hall, describes a cylindrical blind having walls resembling a tree trunk, windows on all sides, and a roof with channels to direct rain away from the windows.

A third style of blinds was designed to elevate the hunter out of an animal's line of sight. For example, U.S. Pat. No. 4,606,142, issued to Charles F. Reneau, describes an elevated blind without any cross-brackets between the legs, intended to make assembly easier. Another example is U.S. Pat. No. 4,719,716, issued to Tom H. Chrisley Jr., describes a cylindrical blind having windows facing all directions, mounted on a fixed or mobile stand in a manner allowing it to be raised or lowered.

Foreign patents related to tree stands include Austrian Pat. No. 54,220 and Swiss Pat. No. 348,230.

None of the above inventions and patents, taken either singularly or in combination, is seen to describe the instant invention as claimed. Thus a scent-free wildlife blind solving the aforementioned problems is desired.

SUMMARY OF THE INVENTION

The present invention is a hunting blind designed not only to hide a hunter from an animal's sight, but also from the animal's sense of smell. The blind comprises a completely enclosed room-type, shelter, having a small air vent at the bottom, and a reinforced flexible hose extending from the top of the blind to a height of approximately 30 feet. A preferred hose is 4 inches in diameter, corrugated, and wire reinforced. Such a hose will be free-standing, but can be lowered to facilitate moving the blind. Preferably, the bottom vent is approximately 4 inches in diameter. The blind includes a door and a plurality of windows, which are substantially airtight when closed, but which can be opened to allow entry/exiting, and to allow shooting from the blind.

When the above-described blind is placed in a field, the wind will create the appropriate airflow due to the air speed differentials between the top vent opening of the hose and its bottom vent opening. For purposes of example, the speed of the wind will be zero at ground level, because of the friction between the wind and the ground. For all distances from the ground low enough to be relevant to this discussion, wind-speed will increase with increasing height. The wind is therefore travelling faster 30 feet from the ground, at the top of the flexible tube, than it is near ground level, at the lower air vent. It is well known in physics that, where fluid or gas flow is concerned, the pressure exerted on a surface by the fluid or gas is inversely proportional to the gas' speed. Therefore, the pressure exerted by the wind on the inside of the shelter at the bottom vent is greater than the pressure at the top of the tube. The resulting pressure difference forces air in through the bottom vent, and out through the top tube. The airflow carries the scent of the shelter's occupants out the top of the tube, high enough so that nearby animals will not smell the occupants.

Although the primary purpose of enclosing the blind is to allow the wind to create the necessary airflow, it has the added advantage of protecting the occupants from cold or wet weather.

Accordingly, it is a principal object of the invention to provide a wildlife blind which hides the occupants from the animal's sense of smell.

It is another object of the invention to provide a wildlife blind which bides the occupants from the animal's sight.

It is a further object of the invention to provide a wildlife blind which protects the occupants from cold or wet weather.

Still another object of the invention is to provide a portable wildlife blind.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
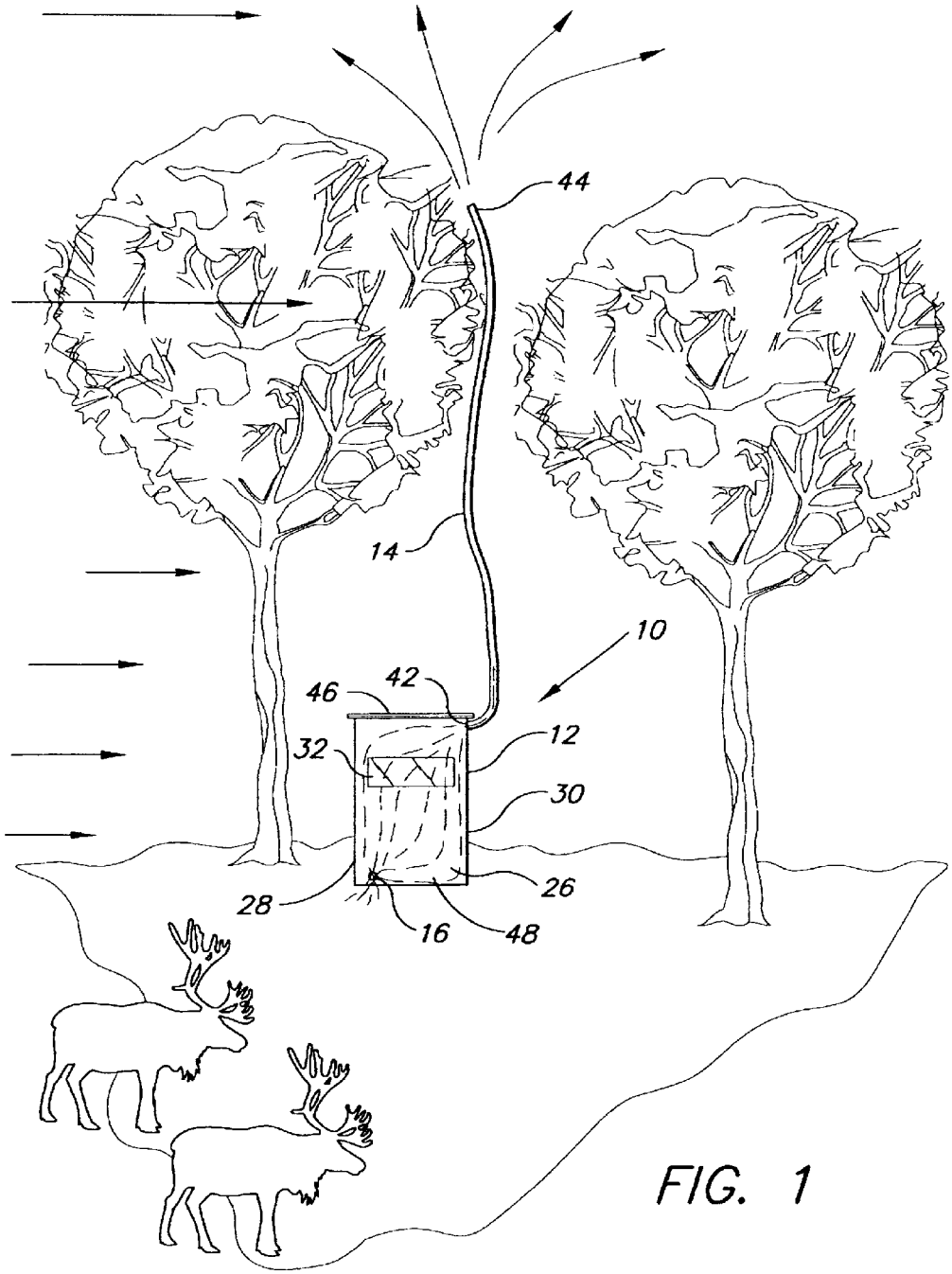
FIG. 1 is an environmental view of a scent-free wildlife blind according to the present invention.

Referring to FIG. 1, the present invention, a scent-free wildlife blind 10, comprises a room-like shelter 12, a tube 14 extending from the top of the shelter to a height of approximately 30 feet from the ground, and a small vent 16 in one side of the shelter close to ground level.

Figure 3:
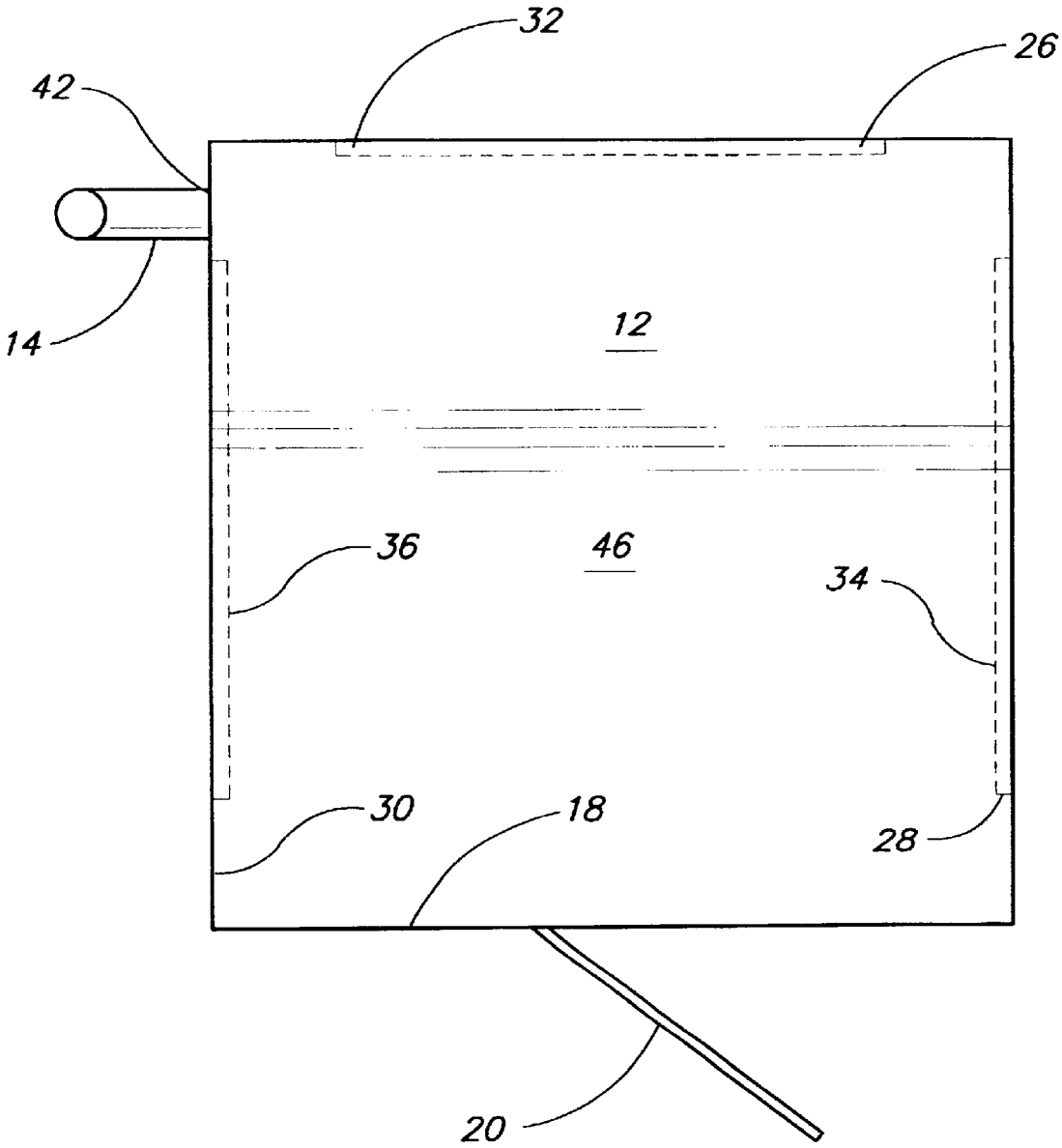
FIG. 3 is a top plan view of the scent-free wildlife blind.
Figure 4:
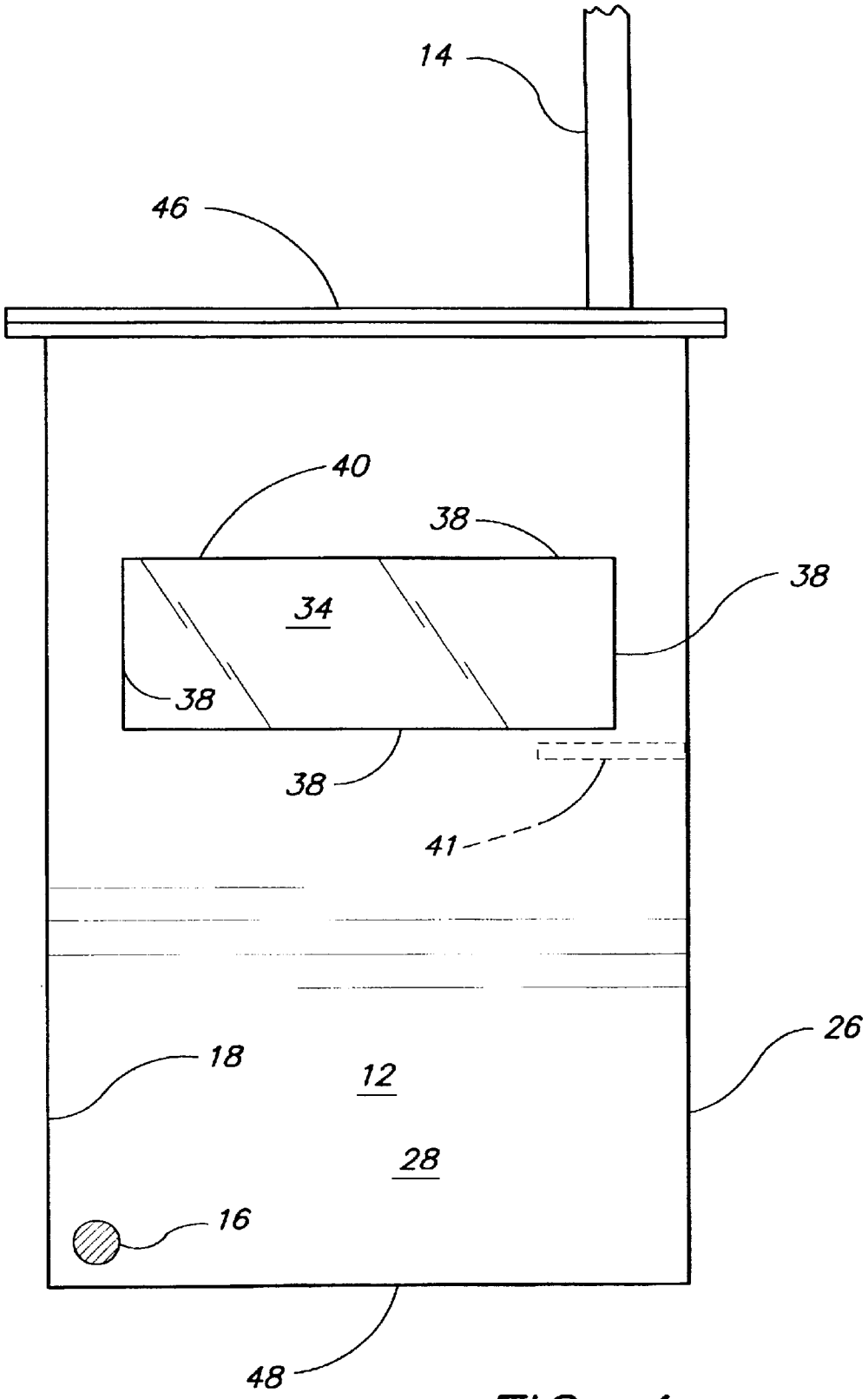
FIG. 4 is a side elevational view of the scent-free wildlife blind.
Figure 5:
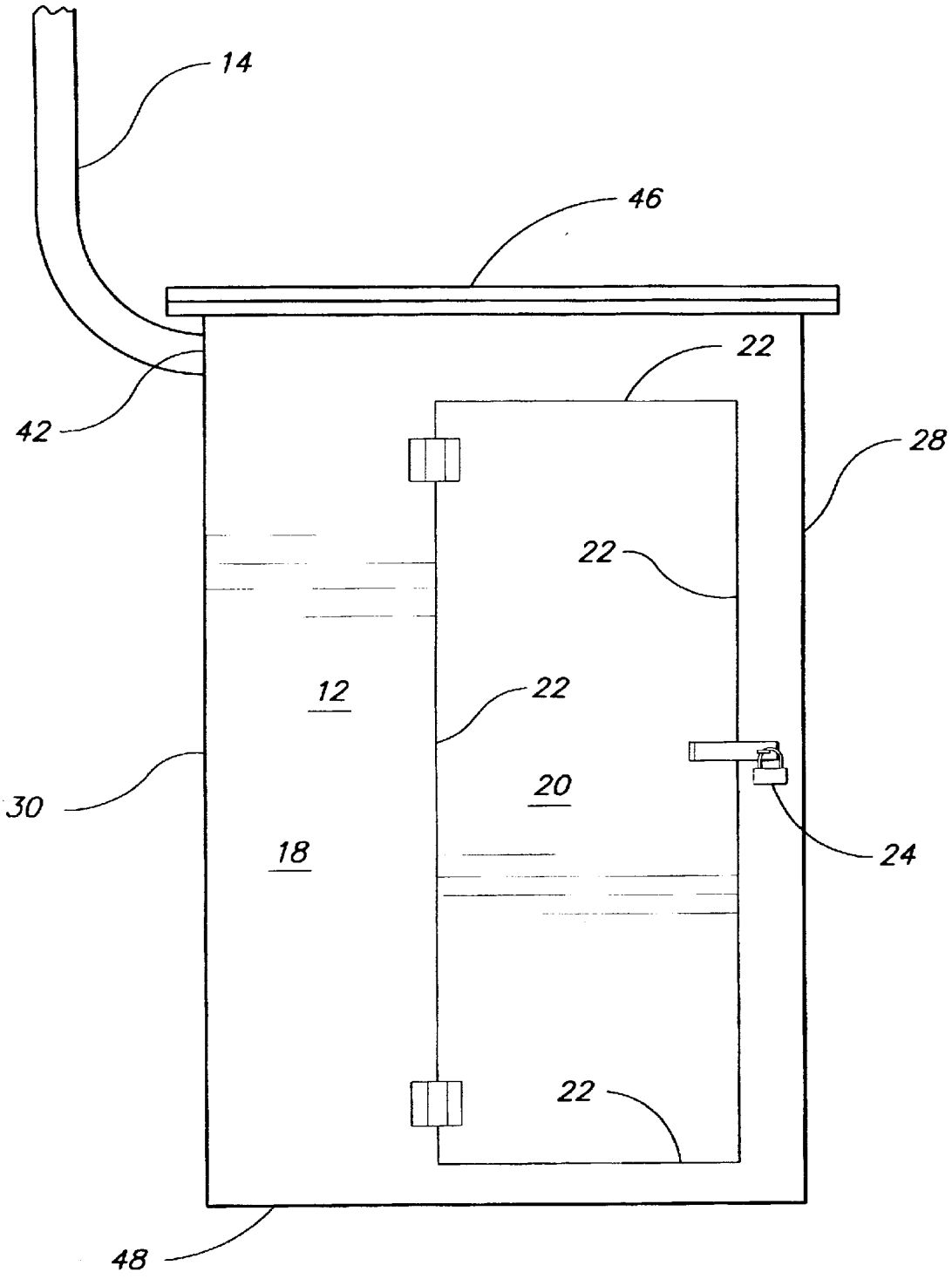
FIG. 5 is a rear elevational view of the scent-free wildlife blind.

The shelter 12 includes a roof 46, floor 48, front 26, rear 18, and sides 28,30. The shelter 12 must be dimensionally suited to comfortably contain one or more hunters or wildlife observers, and their equipment. Preferably, it is also small enough to be easily portable. Some suggested dimensions are 4 feet long by 4 feet wide by 5½ feet high. Referring to FIG. 5, the rear 18 of the shelter has a door 20, which includes foam rubber strips along the edges 22, limiting air flow through the door when it is closed, to help maintain pressure differentials. Preferably, lock 24 prevents unauthorized access to the blind when it is unoccupied. Referring to FIGS. 3 and 4, the front 26 and sides 28,30 include windows 32,34,36, also having foam rubber strips along the edges 38 to limit air flow when the windows 32,34,36 are closed. The windows can be opened to allow shooting. One suggested embodiment is to hingedly attach the top of the windows 40 so that the window pivots into the shelter when opened.

A preferred and suggested material for the windows 32,34,36 is plexiglass. A suggested material for the remainder of the shelter is plastic, although other materials, such as wood, could certainly be used.

It is suggested that the shelter 12 include a carpeted shelf 41 below front window 34 inside the shelter, as illustrated in FIG. 4. Shelf 40 can serve to help steady a rifle for shooting.

Figure 2:
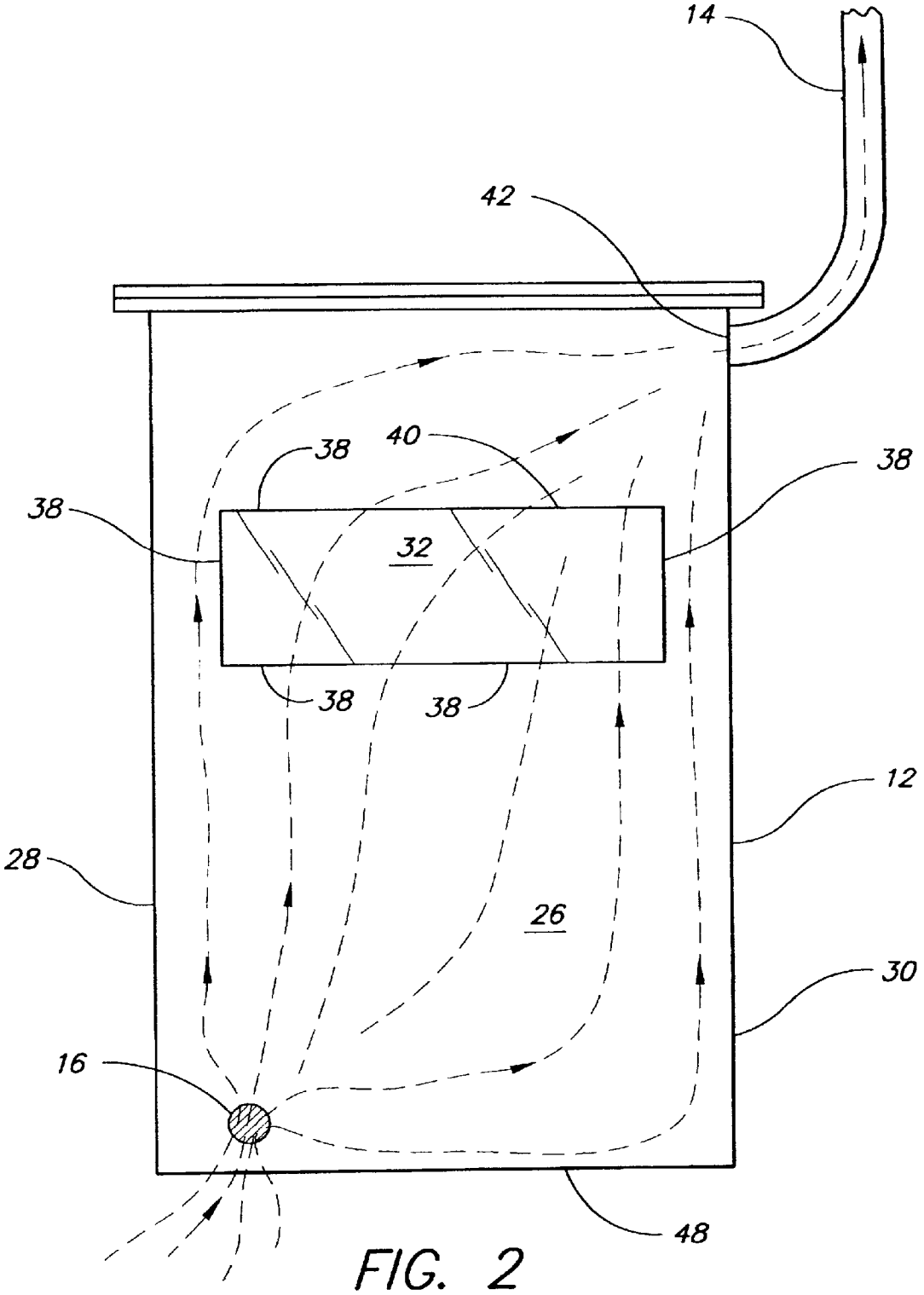
FIG. 2 is a front elevational view of the scent-free wildlife blind, showing airflow through the blind.

Shelter 12 includes a vent 16 near the bottom of front 26, shown in FIG. 2, or side 28, shown in FIG. 4. The vent is preferably a 4 inch diameter opening.

Referring to FIGS. 1, 2, and 3, tube 14 is attached at end 42 to side 30 near the top. End 44 extends to a height of approximately 30 feet above the ground. The tube is preferably made from 4 inch diameter corrugated, wire reinforced flexible tubing. Such tubing will allow the tube to be free standing when the blind 10 is in use, but will allow the tube to be lowered for ease of transporting the blind 10.

FIGS. 1 and 2 illustrate the airflow through the shelter 10. The proper airflow is created by the normal winds around the shelter. For purposes of discussion, the speed of the wind will be zero at ground level due to friction between the air and the ground. Windspeed will increase with increasing height for all heights close enough to the ground to be relevant to this discussion. It is well known in physics that the speed of a fluid or gas over a surface is inversely proportional to the pressure exerted by that gas over that surface. Therefore, because the wind is travelling faster at the top 44 of the tube 14 than at the bottom vent 16, the pressure exerted by the wind on the air inside the blind 10 is higher at vent 16 than at the top 44 of tube 14. This difference in pressure will cause air to flow into vent 16, upwards through shelter 12, into tube end 42, upwards through tube 14, and out through tube end 44, carrying the occupant's scent with it. The scent will exit the shelter 30 feet above the ground, where animals will be unable to smell it.

The inventor has tested two prototypes of his invention, and has observed animals coming within a few feet of the shelter while the inventor occupied the blind. The animals stayed nearby for over an hour, but left within a few minutes of when the inventor opened a window, releasing his scent.

It is to be understood that the present invention is not limited to the embodiments described above, but encompasses any and all embodiments within the scope of the following claims.

I claim:

1. A scent-free wildlife blind sitting on the ground comprising:

an enclosed shelter dimensionally adapted for enclosing at least one person, said shelter having a floor, a roof, four sides, and an interior, said sides having upper and lower ends;

a vent located near said lower end of one of said sides;

an elongated tube having a first end and a second end, said first end attached to said upper end of one of said sides, said second end being positionable a substantial distance above the ground, said one of said sides having an opening corresponding to said first end;

a door having top, side, and bottom edges, said edges further comprising an air seal; and at least one window having top, side, and bottom edges, said edges further comprising an air seal.

2. The scent-free wildlife blind according to claim 1, wherein said elongated tube is approximately 4 inches in diameter.

3. The scent-free wildlife blind according to claim 2, wherein said elongated tube is flexible and approximately 30 feet in length.

4. The scent-free wildlife blind according to claim 3, wherein said elongated tube is made from corrugated, wire reinforced tubing.

5. The scent-free wildlife blind according to claim 1, wherein said vent has a diameter, said elongated tube further has a diameter, and said vent's diameter is substantially equal to said diameter of said elongated tube.

6. The scent-free wildlife blind according to claim 1, wherein said vent has a diameter of 4 inches.

7. The scent-free wildlife blind according to claim 1, wherein said floor, roof, and sides are made from plastic.

8. The scent-free wildlife blind according to claim 1, wherein said floor, roof, and sides are made from wood.

9. The scent-free wildlife blind according to claim 1, wherein said shelter is approximately 4 feet long by 4 feet wide by 5½ feet high.

10. The scent-free wildlife blind according to claim 1, wherein said at least one window is hingedly connected along one of said at least one window's edges for opening said windows and said air seals are each a rubberized strip.

11. The scent-free wildlife blind according to claim 10, wherein said windows open towards said interior of said shelter.

12. The scent-free wildlife blind according to claim 10, wherein one of said sides includes a horizontal shelf adjacent to said bottom edge of one of said windows, within said interior of said shelter.

13. The scent-free wildlife blind according to claim 12, wherein said shelf is carpeted.

*14. A wildlife blind having controlled air flow therethrough, comprising:*

*an enclosure adapted for enclosing at least one person, said enclosure having an upper and a lower end and a sealable entrance;*

*an air vent located in said lower end of said enclosure; and*

*an elongated tube attached at a first end to an opening in said upper end of said enclosure, said elongated tube having a second end positionable a substantial distance above said enclosure;*

*wherein said enclosure is sealed in such a manner to promote air flow through said vent and out of said enclosure through said elongated tube such that any odors within said*

*enclosure are expelled from said elongated tube a substantial distance above said enclosure.*

*15. A wildlife blind according to claim 14, wherein said blind includes a roof and said opening in said upper end of said enclosure is located in said roof.*

*16. A wildlife blind according to claim 14, wherein said opening in said upper end of said enclosure is located in a sidewall of said enclosure.*

*17. A wildlife blind according to claim 14, wherein said vent in said lower end of said enclosure is located in a bottom of said enclosure.*

*18. A wildlife blind according to claim 14, wherein said vent in said lower end of said enclosure is located in a sidewall of said enclosure.*

*19. A wildlife blind according to claim 14, wherein said second end of said elongated tube extends to a height of approximately 30 feet.*

*20. A wildlife blind according to claim 14, wherein said elongated tube is free-standing.*

*21. A wildlife blind, comprising:*

*an enclosure having a roof, a floor, sidewalls, a door, and at least one window, wherein said door and said at least one window are substantially airtight when closed;*

*an air vent located in a lower end of said enclosure; and*

*a flexible, elongated tube attached at a first end to an opening in an upper end of said enclosure, said elongated tube having a second end positionable a substantial distance above said enclosure;*

*wherein said enclosure is sealed in such a manner to promote air flow into said enclosure through said vent and out of said enclosure through said elongated tube such that any odors within said enclosure are expelled from said elongated tube a substantial distance above said enclosure.*

*22. A wildlife blind according to claim 21, wherein said opening in said upper end of said enclosure is located in said roof of said enclosure.*

*23. A wildlife blind according to claim 21, wherein said opening in said upper end of said enclosure is located in a sidewall of said enclosure.*

*24. A wildlife blind according to claim 21, wherein said vent in said lower end of said enclosure is located in a bottom of said enclosure.*

*25. A wildlife blind according to claim 21, wherein said vent in said lower end of said enclosure is located in one of said sidewalls of said enclosure.*

*26. A wildlife blind according to claim 21, wherein said second end of said elongated tube extends to a height of approximately 30 feet.*

*27. A wildlife blind for reducing the emanation of human scent proximal said blind, comprising:*

*means for enclosing at least one person, said enclosing means having upper and lower ends;*

*means for entering said enclosing means;*

*means located in said lower end for venting air into said enclosing means;*

*means located in said upper end for allowing air to exit said upper end;*

*means connected to said upper end through said air exit means for sealably transporting air containing human scent from within said enclosure to a location substantially above said enclosing means; and,*

*wherein said enclosing means is sealed such that air is promoted through said vent means and through and out said means for sealably transporting air containing human scent within said enclosure to a location substantially above said enclosing means.*

*28. A wildlife blind as recited in claim 27, wherein said enclosure includes a roof located in said upper end and said air exit means is located in said roof.*

*29. A wildlife blind as recited in claim 28, wherein said means for sealably transporting air to a location substantially above said enclosing means comprises an elongated tube having a first end connected to said air exit means and a second end positioned a substantial distance above said enclosing means.*

* * * * *